Sept. 13, 1949.  G. A. MOORE  2,481,611
APPARATUS FOR PACKING COFFEE
Original Filed Jan. 23, 1941
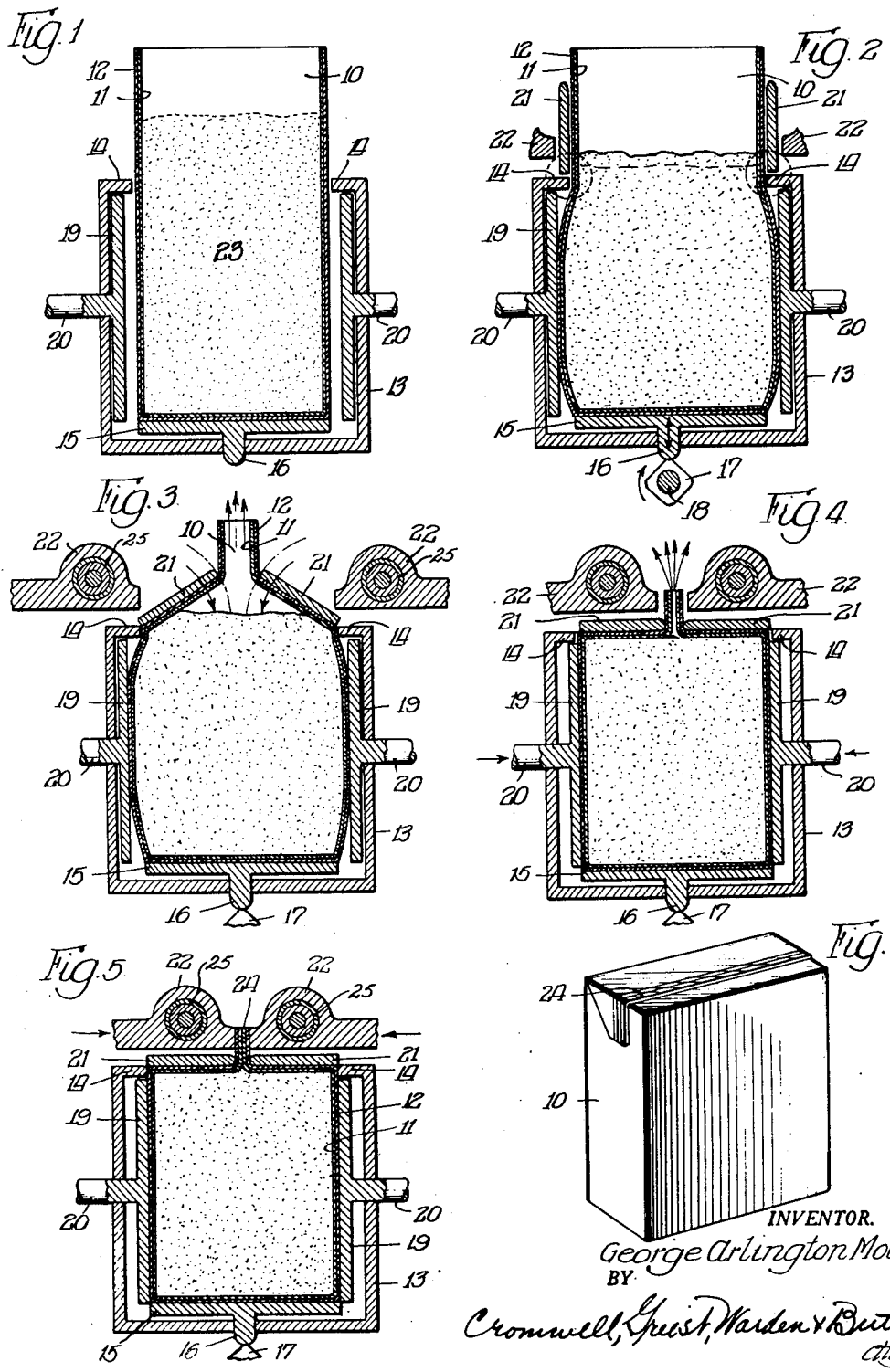

Patented Sept. 13, 1949

2,481,611

UNITED STATES PATENT OFFICE 2,481,611

APPARATUS FOR PACKING COFFEE

George Arlington Moore, New York, N. Y., assignor, by mesne assignments, to Shellmar Products Corporation, Mount Vernon, Ohio, a corporation of Delaware Original application January 23, 1941, Serial No. 375,589. Divided and this application May 17, 1944, Serial No. 536,057

3 Claims. (Cl. 226—56)

The present invention relates to an improved apparatus for packing coffee in a flexible container, and has particular reference to providing a compact, hermetically sealed package of coffee which will retain its shape and preserve the coffee for extensive periods of time. This is a division of my co-pending application Serial No. 375,589 filed January 23, 1941, now abandoned.

A principal object of the invention is the packing of coffee in a container composed of an inner layer of a gas-resistant material such as rubber hydrochloride and an outer protective sheet of paper or the like, the method including the steps of loading freshly roasted coffee in the container, subjecting the container to a vibratory action to partially pack the coffee, compressing the sides of the container inwardly into regular shape, pressing the cover portions downwardly into compact relation with respect to the top of the body of coffee, and hermetically sealing the coffee by the application of heat and pressure to the mouth of the container.

Another object of the invention is the packing of coffee in a container of the type described by initially filling the container with a greater volume of coffee than the intended volume of the final package, subjecting the container and coffee to combined vibration and compression, and hermetically sealing the container in compact relation with respect to the body of coffee.

Still another object of the invention is the packing of coffee in a container of the type described by inserting the empty container in a chuck having vibratory means and inwardly extensible plates or slides, exhausting air from the container, exhausting air from a body of freshly roasted coffee, replacing the air in the coffee and container with carbon dioxide, dumping the coffee into the container in a volume larger than the intended volume of the package, vibrating the coffee and container to partially compact the coffee, pressing the sides of the container inwardly to further compact the coffee, folding the cover-forming portions of the mouth of the bag over in compact relation with respect to the body of coffee so as to force out excess quantities of carbon dioxide contained in the coffee and container and thereby to exclude air from entering the container during the closing operation, and heat-sealing the mouth of the container.

These and other objects will be observed upon consideration of the following specification and by reference to the accompanying drawings, in which Fig. 1 is a sectional view of a vibration and compression chuck having a container positioned in it;

Fig. 2 is a similar view showing the container filled with a larger volume of coffee than the intended size of the package and illustrating the vibration of the coffee;

Fig. 3 shows the folding of the cover-forming portions of the mouth of the container downwardly into compact relation with respect to the coffee;

Fig. 4 illustrates the compression of the sides of the container and the operation of the heat-sealing mechanism;

Fig. 5 discloses the final operation of sealing the mouth of the container; and

Fig. 6 illustrates the form of the container after the mouth has been sealed and folded over in its final position.

Considerable difficulty heretofore has been encountered in the packaging of coffee in flexible containers. If the coffee is packed in freshly roasted condition in a hermetically sealed container, the coffee evolves carbon dioxide which causes the container to become bloated. To compensate for this factor it has been suggested that an extra size bag be employed, to provide room for the evolved carbon dioxide. Other suggestions have included the packing of the coffee in vacuum. The vacuum packing of coffee in flexible containers has not been particularly satisfactory. When the coffee first is packed in vacuum, the outsides of the container are pressed against the coffee under atmospheric pressure to form a hard, rock-like package which seems to be prone to develop leaks. Also, evolution of carbon dioxide by the coffee will cause some, if not all, of the containers to become bloated, thereby providing an undesirable lack of uniformity and an unmerchantable appearance. The present invention provides for an effective packing of freshly roasted coffee in such a manner as to avoid many of the objections attending the prior known methods of packing coffee.

The container indicated at 10 in Fig. 1 is composed of an inner layer 11 of "Pliofilm," a commercially known form of transparent rubber hydrochloride sheet of thermoplastic nature. A protective sheet of paper indicated at 12 is laminated to the inner pellicle of transparent rubber hydrochloride. The container may be of any suitable construction or design providing a continuous, substantially hermetically sealed rubber hydrochloride inner surface. Since the form of the container does not enter into the invention, save in the manner indicated, no particular container construction has been shown.

The chuck 13 in which the container is positioned consists of an open-ended casing which is somewhat larger than the container itself. At the top of the chuck the overhanging ledges 14 extend inwardly almost into contact with the container.

In order to subject the container and its contents to a vibratory action, there is provided in the bottom of the chuck 13 a plate 15 which is of substantially the same shape as the bottom of the container. The plate 15 is connected to a downwardly extending lug 16. As shown in Fig. 2, the lower end of the lug 16 is positioned adjacent a square lug 17 mounted on the rotatable shaft 18. As the shaft 18 is rotated rapidly, the corners of the vibration lug 17 move the plate 15 upwardly and as the corners pass the lug 16 the plate 15 drops to the bottom of the chuck 13, thereby providing a vibratory action which partially packs the coffee in the bag 10.

Each of the four sides of the chuck 13 is provided with a side plate 19 which has an outwardly extending shaft 20 passing through the sides of the chuck. These shafts 20 may be moved inwardly by any suitable mechanism (not shown) to compress the container into regular shape.

Pivotally positioned against the inner ends of two of the opposing ledges 14 are the cover or top-forming plates 21 which are rotated from the vertical position shown in Fig. 2 into the horizontal position shown in Fig. 4, the inner ends of the plates 21 being spaced apart slightly as shown in Fig. 4 when in horizontal position to provide for the egress of gas from the interior of the container.

Heat-sealing elements 22 are mounted adjacent the plates 21 and these elements are adapted to move inwardly from the position shown in Fig. 3 to the position shown in Fig. 5 after the cover-forming plates have moved into horizontal position.

An initial step in the packaging of the freshly roasted coffee includes dumping into the container 10 a loose quantity of coffee in a volume greater than the volume of the final package. The weight of the coffee causes a slight bulging of the sides of the container 10. Either before or after dumping the coffee into the container, both the coffee and container may be exhausted of air by a suitable vacuum exhaustion, and this then may be replaced with an inert gas such as carbon dioxide. In this arrangement, the coffee is dumped into an atmosphere of carbon dioxide in the empty container 10, which tends to replace residual quantities of air which may be in the coffee by carbon dioxide.

The air in the coffee may be replaced with carbon dioxide by initially loading the coffee in the bag and then blowing carbon dioxide into the coffee to displace the air therein upwardly. However, it is preferred to dump the coffee into an atmosphere of carbon dioxide in the manner specified, since this provides for a more effective replacement of the air. In exhausting the container, both the inner and outer walls of the container are subjected to a substantially equal degree of reduced pressure in order to prevent the container from collapsing or unduly extending.

After loading the container 10 with coffee in the manner described, the shaft 18 is rotated rapidly to provide a vibratory action on the bottom of the container. This action causes the relatively large and loose body of coffee indicated at 23 in Fig. 1 to pack into the position shown in Fig. 2. That is, the upper level of the body of coffee is lowered substantially by the vibratory action and at the same time the vertical walls of the container are bulged outwardly.

When the vibratory action is substantially complete and has partially compacted the body of coffee, the cover-forming plates 21 are rotated from the vertical position shown in Fig. 2 into the horizontal position shown in Fig. 4. The vibratory action tends to create a turbulence in the carbon dioxide which is above the top of the coffee in the upper extension of the container, and this action makes it possible that a small quantity of air may get into the upper portion of the container. As the plates 21 rotate through the position shown in Fig. 3 it will be seen that the upper extensions of the container are folded over into cover-forming position and this action causes the gas in the upper portion of the container to be squeezed out of the open mouth, thereby permitting chance quantities of air in the upper portion of the container from getting into the body of coffee.

The rotation of the plates 21 presses the coffee at the top of the body of coffee downwardly to exert a further compacting action upon it and to fix the upper level of the coffee for the final package. The plates 19 then are pressed inwardly from the position shown in Fig. 3 to the position shown in Fig. 4, thereby further compacting the coffee and completing the formation of a regularly shaped package of rectangular cross-section by returning the outwardly bulged walls to their normal planular position.

As the outer vertical walls of the container are pressed inwardly in the manner described and after the cover-forming plates 21 have been rotated into the position shown in the drawings, further quantities of carbon dioxide pass out of the container through the restricted opening in the mouth thereof. This provides equilibrium pressure between the inside and outside of the container and is further assurance that any air which may have entered the mouth of the container will not be sealed with the coffee.

The sealing elements 22 are provided with electric heating cartridges 25—25 of known type, and are moved into sealing relation with respect to the cover-forming extensions of the container as shown in Figs. 3, 4 and 5, and sufficient heat and pressure are applied to seal the adjacent surfaces of rubber hydrochloride together. Since the container has a continuous inner surface of rubber hydrochloride, the pressing together of the cover-forming extensions and the application of heat and pressure thereto provides for closure of the container without disturbing the Pliofilm-to-Pliofilm relation of the interior.

After the sealing operation is complete, the container is removed from the chuck and the sealed upper extension 24 is folded over adjacent the sides of the package in the manner shown in Fig. 6. It will be observed that the finished package is of somewhat less volume than the initial volume of the coffee 23.

After completion of the package a plurality of the packages are assembled and confined together in a space which prevents expansion of the side walls upon evolution of carbon dioxide within the container. For example, the individual packages can be placed in paper board cartons, and the cartons may be fitted into a relatively strong shipping case to provide a closely fitting assembly. Such an assembly of containers may be disassembled after the period within which carbon dioxide normally develops in coffee, and it will be found that the packages are of their origonal shape and condition. The combined vibratory and compression action utilized in forming the containers is of material benefit in providing for this retention of shape. The coffee retains its freshness and shape and the containers may be shipped to the retailer immediately after packing.

The mechanism described herein may be changed considerably without departing from the scope of the invention as defined in the appended claims, and likewise may be applicable to the packing of other materials of a granular nature.

I claim:

1. Apparatus for packing coffee, comprising a four walled chuck for retaining a container of smaller dimensions, vibratory means for partially packing granular materials held in a container positioned in said chuck, and four movable compression plates inwardly of and in parallel relation with the respective walls of the chuck, each compression plate being provided with a shaft, and each of the walls of the chuck having an opening through which a shaft extends for shaping a container in the chuck by means of said compression plates.

2. Apparatus for packing coffee and the like, comprising a four walled container-retaining chuck, vibratory means operable upon the bottom of a container in said chuck, four movable compression plates inwardly of and in parallel relation with the respective walls of the chuck, each compression plate being provided with a shaft, each of the walls of the chuck having an opening through which a shaft extends for shaping a container in the chuck by means of said compression plates, and cover-folding members above said plates.

3. Apparatus for packing coffee and the like, comprising a four-walled container-retaining chuck, a vibrating plate adjacent a lower portion of said chuck, four movable compression plates inwardly of and in parallel relation with the respective walls of the chuck, each compression plate being provided with a shaft, each of the walls of the chuck having an opening through which a shaft extends for shaping a container in the chuck by means of said compression plates, cover-folding members above said plates, and sealing mechanism above said members.

GEORGE ARLINGTON MOORE.

REFERENCES CITED

The following references are of record in the file of this patent:

UNITED STATES PATENTS

| Number | Name | Date |
|---|---|---|
| 708,627 | Doble | Sept. 9, 1902 |
| 1,553,677 | Dunbar | Sept. 15, 1925 |
| 1,781,714 | Anderson | Nov. 18, 1930 |
| 1,973,573 | Ecklund | Oct. 30, 1934 |
| 2,161,071 | McGrath et al. | June 6, 1939 |
| 2,181,308 | Abramowitz et al. | Nov. 28, 1939 |
| 2,211,360 | Adams | Aug. 13, 1940 |
| 2,329,311 | Waters | Sept. 14, 1943 |